Sept. 4, 1956   S. J. PARADISO ET AL   2,761,522
TANK AND TANK MOVING APPARATUS

Filed May 15, 1952   3 Sheets-Sheet 1

INVENTOR
ARTHUR A. HILGART
SAM J. PARADISO
BY
ATTORNEY

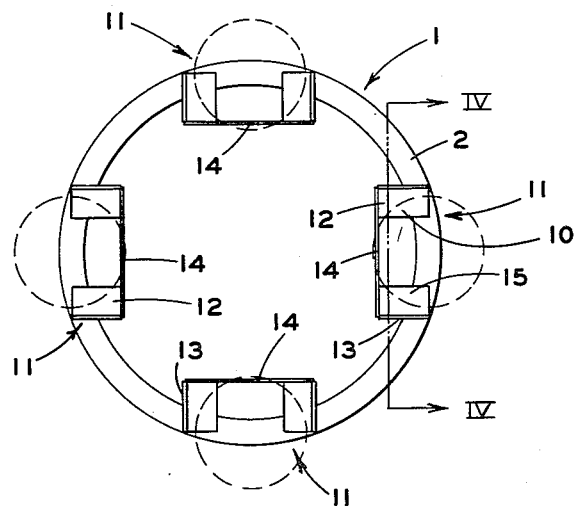
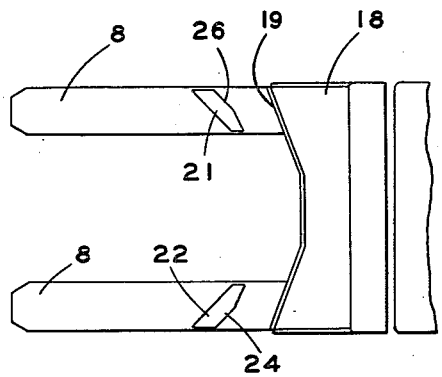
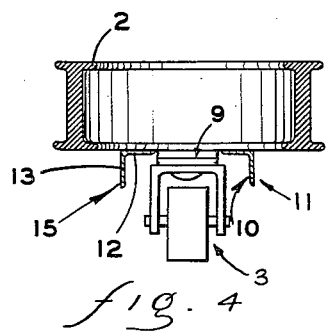

Sept. 4, 1956   S. J. PARADISO ET AL   2,761,522
TANK AND TANK MOVING APPARATUS
Filed May 15, 1952   3 Sheets-Sheet 3
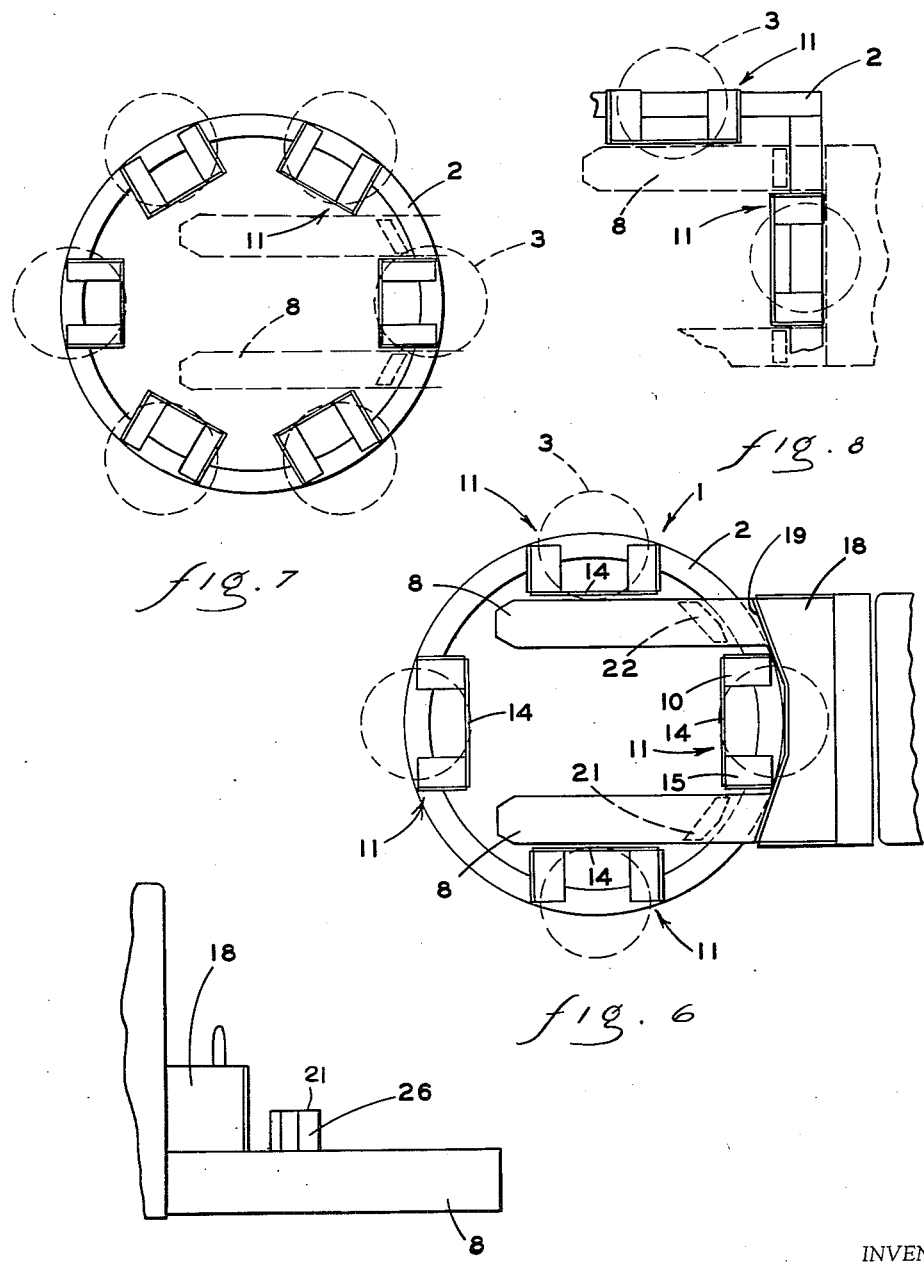
INVENTOR
ARTHUR A. HILGART
SAM J. PARADISO
BY
ATTORNEY

United States Patent Office 2,761,522
Patented Sept. 4, 1956

2,761,522

TANK AND TANK MOVING APPARATUS

Sam J. Paradiso and Arthur A. Hilgart, Kalamazoo, Mich., assignors to The Upjohn Company, Kalamazoo, Mich., a corporation of Michigan Application May 15, 1952, Serial No. 288,076

7 Claims. (Cl. 180—12)

This invention relates to materials handling equipment and particularly it relates to combined tank, dolly and prime mover structure by which a large tank can be readily moved from one point to another in a manufacturing operation and in which the prime mover may be connected and disconnected by a simple manipulation.

In a manufacturing operation such as a pharmaceutical plant, wherein liquids are handled in sufficiently small quantities, or batches, that piping thereof is not feasible or is undesirable because of corrosion or contamination of product, it is nevertheless desirable to provide means for moving quantities of such liquid which are too large to handle conveniently in containers of such size as to be handled manually, such as ordinary drums or barrels.

Therefore, it has been desirable to provide tanks of relatively large size, such as of the order from about 200 gallons to about 2000 gallons, and to provide same with such means of support and such means for the power driving thereof that they will be capable of rapid and convenient movement from one processing station to another and a high degree of flexibility in the manufacturing operation will be obtained. Inasmuch as a tank containing, for example, 1000 gallons of water will weigh 8300 pounds, plus the weight of the tank itself, it will be appreciated that the supporting and moving apparatus must be strong and sturdy, properly designed for stability, and connectible to a suitable prime mover with sufficient rigidity to provide the operator with a high degree of control over the tank. Further, the apparatus must be of such a nature that it can be handled by relatively unskilled workmen with a minimum degree of risk, both to the workmen operating the apparatus and to co-workers, and to the equipment among which, and to and from which, said tank is being moved. Further, the prime mover must be capable of rapid connection and disconnection to and from said tank by such unskilled workmen in such a manner that it can be quickly and conveniently handled and yet in such a manner that when connection is made it will be firm and positive and will give the operator of the prime mover firm and positive control over the tank. Particularly, it is essential that the connection must be of such character that the operator will not believe he has made connection when connection is in fact imperfect and thus possibly permitting a tank to get out of control. Still further, it is necessary that the point of connection of the prime mover to the tank shall be as low as possible in order to reduce to a minimum the likelihood of the tank's becoming unstable.

Accordingly, a major object of the invention is to provide means for moving quantities of processed liquids from one processing point to another in a processing plant wherein said quantities of liquid are larger than can be conveniently handled by conventional drums or barrels and yet are smaller than can be economically handled by special pipes, hoses or conduits or wherein because of the special nature of certain products (as medicinals) it is undesirable to handle by pipes, hoses, or conduits in view of possible contamination.

A further object of the invention has been to provide means for supporting and moving large tank structures, particularly tank structures containing quantities of liquid of the order of from about 200 gallons to about 2000 gallons.

A further object of the invention has been to provide apparatus, as aforesaid, in which a prime mover can be attached to, and disconnected from, a tank and wheel support combination.

A further object of the invention has been to provide apparatus, as aforesaid, in which the connection and disconnection of said prime mover to and from the combination of the tank and its support may be made quickly and easily and yet wherein the connection when made will be firm and positive.

A further object of the invention has been to provide apparatus, as aforesaid, in which the tank is at all times supported upon wheeled structure and the prime mover merely provides motive power therefor.

A further object of the invention has been to provide apparatus, as aforesaid, which can be used with a commercially available prime mover.

A further object of the invention has been to provide apparatus, as aforesaid, in which the point of application of force to said tank and its wheeled support is as low as possible and is in any event substantially below the center of gravity of said tank and its wheeled support.

A further object of the invention has been to provide apparatus, as aforesaid, which can be connected to, and disconnected from, a prime mover without the necessity of the operator of the prime mover leaving the position which he occupies in operating the prime mover.

A further object of the invention has been to provide apparatus, as aforesaid, in which a positive and solid connection can be made between the prime mover and the tank and wheel combination without the necessity of using any movable parts such as movable couplings, pins or chains.

A further object of the invention has been to provide apparatus, as aforesaid, in which the position of perfect engagement of the inter-engaging parts and the position of imperfect engagement are sufficiently different from each other as to be readily discernible to a workman from the position occupied by him in operating the prime mover.

A further object of the invention has been to provide apparatus, as aforesaid, in which a condition of imperfect engagement between the inter-engaging parts provides such a small amount of tractive force from the prime mover to the tank and support combination that movement of a filled tank under such conditions will not occur, whereby no movement of the tank will be possible without the inter-engaging parts being in properly inter-engaged relationship.

Other objects and purposes of the invention will become apparent to persons acquainted with apparatus of this general type and with the problems involved upon a reading of the following disclosure and reference to the accompanying drawings.

In the drawings:

Figure 2 represents a view of a dolly from the underside thereof with the casters, and caster mounting means, indicated only by broken circles representing the circle of contact of the caster wheel against a supporting surface.

Figure 3 is a top plan view of the fork structure and only partially showing the prime mover.

Figure 4 is a section taken on the line IV—IV of Figure 2 but showing the parts in a normal operating position.

Figure 5 is a side view of the work portion of the prime mover taken on an enlarged scale.

Figure 6 is a bottom view of the fork and dolly in inter-engaged position and showing a portion of the prime mover.

Figure 7 is a view showing a modification.

Figure 8 is a fragmentary view showing a further modification.

General description

Figure 1:
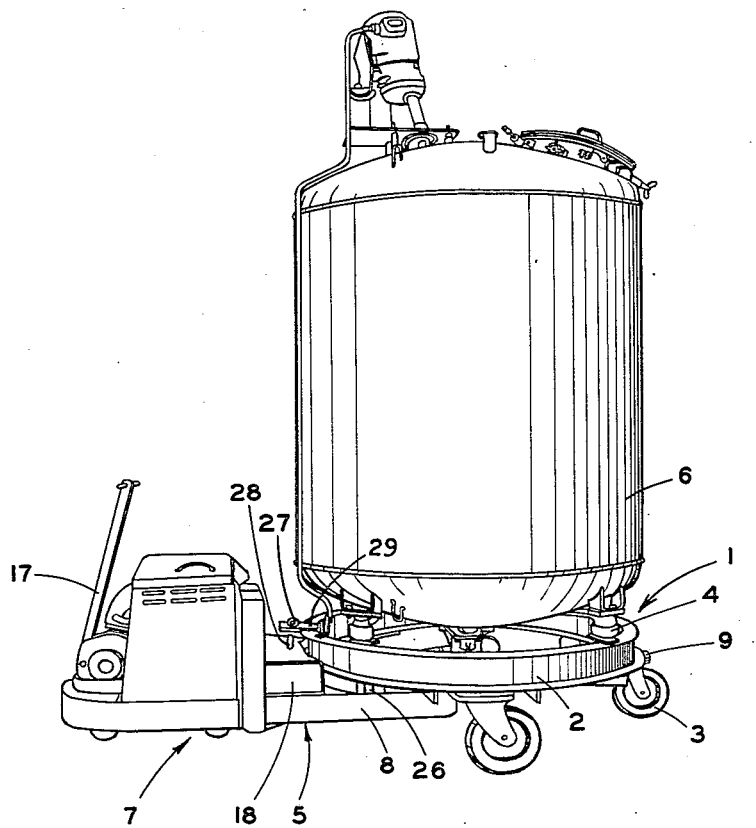
Figure 1 represents a side perspective view of a tank, dolly, and prime mover combination of the invention.

In carrying out the foregoing objectives and purposes, there is provided a tank of desired size which is supported on a surface, as a floor, by a wheeled device, as a dolly or truck. For a prime mover, there is utilized any commercial form of lift-type truck having forwardly projecting liftable arms. Said liftable arms are provided with means for inter-engaging with said truck from the underside thereof in such a manner as to provide positive inter-engagement therebetween when the lift mechanism of said truck has lifted said arms to a predetermined level. A pin and link structure may, if desired, supplement the inter-engagement of said parts and simultaneously provide a readily visible guide therefor, providing only that said pin and said link structure are interengageable by the same movement of said liftable arms as is required for inter-engagement of said liftable arms with the underside of the truck.

Detailed description

The following terms will for purposes of convenient reference, and not with any thought of limitation, be used with the following meanings: the terms "upward" and "downward," and derivatives and synonyms thereof, will denote upward and downward directions with respect to the vertical when the apparatus is in its normal position of use; the terms "forward" and "rearward" and derivatives and synonyms thereof, will refer to directions along the fork of the prime mover away from and toward, respectively, the main body part of the prime mover.

Referring now to the drawings, there is shown (Figure 1) a truck, or dolly, 1 comprising a frame 2 supported on casters 3 and provided with tank blocks 4 upon which the tank 6 is mounted. The prime mover 7 preferably comprises a self propelled prime mover of any conventional type having thereon a lift assembly 5 including one or more, preferably a pair, of vertical liftable fork arms 8. Means detailed hereinafter are provided by which the fork arms 8 and the frame 2 are interengaged for the purpose of securing the dolly and the prime mover closely together and thereby enabling an operator to operate both the prime mover and the tank supporting dolly as a single unit.

Looking now at the dolly 1 in more detail, it is comprised, in the specific embodiment here chosen for illustrative purposes, of a circular frame member 2 comprising a structural beam, such as an I-beam or a C-beam, formed into annular shape. A plurality of swivel casters of any conventional type are fastened to the lower side of said frame in any convenient manner, as by pivotal connection, to caster plates 9 which in turn are fastened as by welding to the underside of the structural member comprising the frame 2.

The tank supporting blocks 4 are of any convenient type and will be selected in pursuance of conventional practice and largely according to the particular kind of tank which the dolly is intended to carry. These blocks will be fastened to the dolly in any convenient manner and will likewise be fastened to the tank in any conventional manner. Inasmuch as they by themselves form no part of this invention, they will not be detailed further.

Extending from the underside of the frame member 2 are a plurality of downwardly extending guide members 11 which in this instance comprise a pair of angle irons 10 and 15 having horizontal flanges 12 by which they are affixed, as by welding, to said frame member 2 and downwardly depending flanges 13 which guide the prime mover fork arms 8 as hereinafter set forth in more detail.

In the particular embodiment shown in Figures 1 to 6, there are four guide members 11 shown but it will be appreciated that any number will be used that can conveniently be arranged around the frame 2. However, inasmuch as the fork arms 8 are, as best shown in Figure 1, in substantially the same horizontal plane as that occupied by the upper portion of the casters, it will be necessary for said arms to pass on either side of one of such casters. Therefore, said pairs of angle irons 10 and 15 are best placed closely adjacent the caster mounting and on either side thereof, as shown in Figures 2 and 4, in order that the fork arms 8, in passing on either side of said angle irons will also pass on either side of one of the casters.

A tie bar 14 may, if desired, be provided for connecting the two angle irons of each of said guide members together for purposes of strengthening same.

Turning now to the prime mover, in the apparatus here shown for illustrative purposes, there is utilized a wheel supported prime mover unit 7, preferably battery driven, and controlled and steered in a conventional manner by the handle 17. The lift assembly 5, comprising the liftable fork arms 8, is movable upwardly and downwardly at the will of the operator in a conventional manner.

Mounted on said liftable arms is a block 18 which has a forward face 19 of substantially such contour as to enable it to fit the external contour of the frame member 2. Spaced forwardly on said liftable arms 8 from said block 18 are the blocks 21 and 22, the spacing of each of said blocks 21 and 22 from the block 18 being sufficient that the frame element 2 is receivable snugly therebetween as shown in Figure 6. The blocks 21 and 22 are, as best shown in Figure 3, placed on the respective liftable arms 8 in such position that their respective outward faces 24 and 26 are substantially parallel to the forward face 19 of the block 18 for the more snug and firm holding of the frame member 2.

Thus, it will be recognized that when the parts are in the interlocked position shown in the drawings, the blocks 18, 21 and 22 prevent forward and rearward horizontal movement of the liftable arms 8 with respect to the frame member 2 and the angle irons 10 and 15 prevent horizontal movement of said liftable arms with respect to said frame in a direction perpendicular to the longitudinal extent of said liftable arms.

For supplementary control and for piloting, if desired, the link plate 29 (Figure 1) may extend rearwardly from a convenient portion of the frame member 2 and it will be provided near its free end with an opening 27. A pin 28 extends upwardly from the block 18 in position to enter the opening 27 when the rest of the parts are in inter-engaging position. By this pin and link construction the operator can readily see when the parts are in position for engagement. This will be more convenient for the operator than to watch the position of the arms 8 and of the blocks 21 and 22 from his position at the rear of the prime mover adjacent the handle 17.

Operation

The operation of the device has been somewhat indicated foregoing but will be summarized for purposes of completeness.

The tank 6 is normally supported upon the truck 1 and will stand or move by moving of said supporting truck at the will of an operator. Said tank may be provided with any convenient means for filling and emptying of same.

When a tank is to be moved, a prime mover whose liftable arms 8 are suitably fitted with blocks 18, 21 and 22 approaches the truck with the liftable arms in a sufficiently low position that said blocks 21 and 22 will go under the frame member 2. It is moved toward the center of said truck in such a manner that the two liftable arms 8 pass on either side of a pair of angle irons 10 and 15. It is so moved until the face 19 of the block 18 is in contact with the peripheral surface of the frame member 2 and at such time the blocks 21 and 22 will have passed to a point inwardly of the radially inner surface of the frame member 2. If the link and pin arrangement is utilized, the pin 28 will at this point be co-axial with the opening 27. The lift mechanism of the prime mover is now operated to lift the arms 8 sufficiently that the blocks 18, 21 and 22 move to positions on either side of the frame member 2. Preferably said arms will be lifted so that they approach close to, or touch, the underside of the frame member 2 but they exert no appreciable, if any, lifting force thereon. At this point the pin 28 will have entered fully into the opening 27 and this may be utilized for purposes of indicating to the operator the proper vertical position of the lift assembly 5.

Thus, the lift arms and the frame member are rigidly locked together and the truck 1 can be precisely controlled for movement in any desired direction by the prime mover 7.

After a tank has been moved into a desired position, the prime mover is disengaged therefrom by merely lowering the lift assembly 5 sufficiently to disengage the pin 28 from the link plate 29 and to move the blocks 21 and 22 below the frame member 2. The prime mover 7 may then be backed away from the truck and disengage without further manipulation.

Figure 7 shows a structure utilized for applying six casters under a frame, the parts being illustrated and numbered in a manner corresponding to that above described and hence needing no detailed description. Figure 8 illustrates fragmentarily the structure utilized where the circular frame 2 is replaced by a rectangular frame, but again the parts are shown and numbered in such a manner that their structure and functioning will be apparent in view of the description given above and they need no further detailing.

Accordingly, I have illustrated and described structure capable of carrying out the objects and purposes above set forth.

While a particular embodiment of the invention has been utilized above as a principal means for disclosing and illustrating the invention, it should be clearly understood that various modifications, in addition to those above specifically indicated, will be apparent to persons acquainted with apparatus of this general type and that such modifications will be included within the scope of the hereinafter appended claims excepting as such claims may by their own terms expressly limit otherwise.

We claim:

1. Apparatus for moving a tank from one processing station to another processing station, comprising in combination: a truck for supporting said tank, said truck having a frame and a plurality of spaced supporting wheels; a prime mover having a pair of spaced, parallel, substantially horizontally extending, liftable arms; a pair of spaced upstanding means on each of said arms, said upstanding means being so spaced apart as to enable them to pass on either side of said frame but to fit snugly adjacent thereto; a pair of spaced downwardly extending members on said frame, the spacing thereof being such as to enable them to fit snugly adjacent said arms on respectively opposite sides thereof; said upstanding means being of less vertical extent than the available clearance under said frame when said liftable arms are in a lowered position.

2. Apparatus for holding quantities of liquids and moving same from one processing station to another processing station, comprising in combination: means defining a tank; a truck having a frame and a plurality of spaced wheels arranged substantially equi-distantly around said frame; a prime mover having horizontally extending liftable arms spaced apart such a distance as to be snugly insertable between said supporting wheels on substantially opposite sides of said frame, and said arms having spaced, upstanding means on their upper sides for engaging said frame; depending means on the underside of said frame intermediate said wheels for engaging said arms, said upstanding means being of less upward extent than the available clearance under said frame when said arms are in their lowermost positions.

3. Apparatus for moving an article from one station to another station, comprising in combination: a truck for supporting said article, said truck having a frame and a plurality of spaced supporting means; a prime mover having a plurality of spaced, horizontally extending lifting arms, said arms being spaced apart such a distance as to be insertable between said support means; a pair of spaced upstanding means on each of said arms, said upstanding means being so spaced apart as to enable them to pass on either side of said frame but to fit snugly adjacent thereto; depending means on the underside of said frame intermediate said supporting means, adjacent depending means being spaced from each other for such a distance as to enable them to fit snugly adjacent each of said arms on opposite sides thereof; said upstanding means being of less vertical extent than the available clearance under said frame when said lifting arms are in lowered position.

4. Apparatus for moving an article from one station to another station, comprising in combination: a truck for supporting said article, said truck having a frame and a plurality of spaced supporting means; a prime mover having at least one horizontally extending lifting arm, said arm being of such size as to be snugly insertable between said support means; a pair of spaced, upstanding means on said arm, said upstanding means being so spaced apart as to enable them to pass on either side of said frame but to fit snugly adjacent thereto; a pair of depending means on the underside of said frame intermediate said supporting means, said pair of depending means being spaced from each other for such a distance as to enable them to fit snugly adjacent said arm on opposite sides thereof, said upstanding means being of less vertical extent than the available clearance under said frame when said lifting arm is in lowered position.

5. Apparatus for moving an article from one station to another station, comprising in combination: a truck for supporting said article, said truck having a frame and a plurality of spaced supporting means, said frame including wall means defining an internal recess spaced from the outer edges thereof; a prime mover having a plurality of spaced, horizontally extending lifting arms, said arms being spaced apart such a distance as to be snugly insertable between said support means; a pair of spaced upstanding means on each of said arms, said upstanding means being so spaced apart as to enable one of said upstanding means to lie snugly adjacent said wall means and the other of said upstanding means to lie snugly adjacent the outer edge of said frame; depending means on the underside of said frame intermediate said supporting means; adjacent depending means being spaced from each other for such a distance as to enable them to fit snugly adjacent each of said arms on opposite sides thereof, said upstanding means being of less vertical extent than the available clearance under said frame when said lifting arms are in lowered position.

6. Apparatus for moving an article from one station to another station comprising in combination: a truck for supporting said article, said truck having a frame and a plurality of spaced supporting means; a prime mover having at least one horizontally extending liftable arm, said arm having spaced, upstanding means on its upper side for engaging said frame; depending means on the underside of said truck for engaging said arm, said upstanding means being of less upward extent than the available clearance under said frame when said arm is in the lowermost position; a vertically positioned pin movable vertically with said arm and a link affixed to said frame, the opening in said link being coaxial with said pin when said upstanding means are in vertical alignment for engaging said frame and said depending means are in vertical alignment for engaging said arm, whereby said pin will engage said opening substantially simultaneously with the engagement of said frame by said upstanding means upon upward movement of said arm.

7. The combination of claim 6 wherein said depending means are located intermediate said supporting means and are adapted to contact opposite sides of said arm.

References Cited in the file of this patent

UNITED STATES PATENTS

| | | |
|---|---|---|
| 1,896,543 | Gfrorer | Feb. 7, 1933 |
| 2,120,042 | Remde | June 7, 1938 |
| 2,495,493 | Wright | Jan. 24, 1950 |
| 2,550,219 | Bollinger | Apr. 24, 1951 |
| 2,568,445 | Grattan | Sept. 18, 1951 |
| 2,601,163 | Miller | June 17, 1952 |
| 2,610,751 | Bevan | Sept. 16, 1952 |
| 2,669,314 | Quayle | Feb. 16, 1954 |

FOREIGN PATENTS

| | | |
|---|---|---|
| 699,807 | Germany | Dec. 6, 1940 |